UNITED STATES PATENT OFFICE.

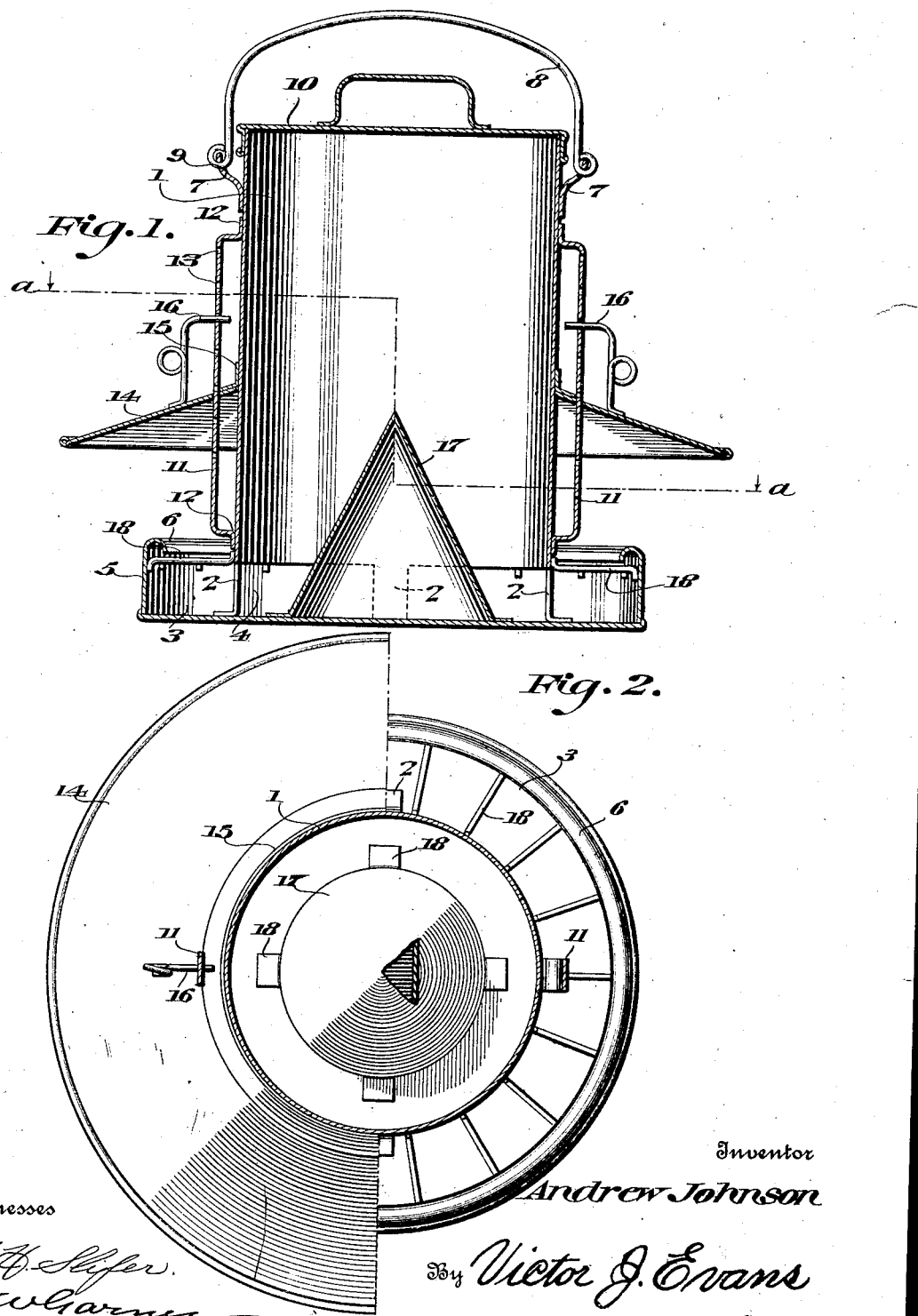

ANDREW JOHNSON, OF CENTRAL CITY, KENTUCKY.

POULTRY-FEEDER.

1,114,482.

Specification of Letters Patent.     Patented Oct. 20, 1914.

Application filed April 1, 1914. Serial No. 828,822.

*To all whom it may concern:*

Be it known that I, ANDREW JOHNSON, a citizen of the United States, residing at Central City, in the county of Muhlenberg and State of Kentucky, have invented new and useful Improvements in Poultry-Feeders, of which the following is a specification.

This invention is an improved poultry feeder and consists in the construction, combination and arrangement of devices hereinafter described and claimed.

The object of the invention is to provide an improved device by means of which poultry may be fed and prevented from wasting the feed.

Another object is to provide an adjustably mounted cover for the feed pan, a further object being to provide means to prevent the fowls from crowding and from throwing the feed sidewise with their bills and wasting it.

In the accompanying drawings:—Figure 1 is a vertical central sectional view of a poultry feeder constructed in accordance with my invention. Fig. 2 is a horizontal sectional view of the same on the plane indicated by the line *a—a* of Fig. 1.

In the embodiment of my invention I provide a cylindrical body or hopper 1 which is provided with space supporting legs 2 at its lower side that bear and are secured on the bottom of a feed pan 3 the diameter of which is greater than that of the hopper. Openings 4 are formed between the supporting legs 2. The feed pan, which is preferably made of sheet metal, has its wall 5 formed at its upper edge with an inwardly extending substantially semi-tubular flange 6. The hopper is arranged centrally on the feed pan.

At the upper side of the hopper, on opposite sides thereof, are ears 7 to which the ends of a bail 8 are pivotally connected as at 9. A removable cover 10 is also provided for the hopper. On opposite sides of the hopper are arranged vertical securing bars 11 the intermediate portions of which are spaced therefrom and the ends of which are inturned and secured thereto as at 12. Each of these bars 11 has a series of adjusting openings 13.

A cover 14 is provided for the feed pan. This cover is of greater diameter than the feed pan and has a central opening through which the hopper extends and also has a collar 15 around said opening which extends upwardly on the hopper. Thereby the cover is adapted to be moved upwardly or downwardly on the hopper to bear directly on the pan if desired to exclude the fowls therefrom or to be adjusted to any desired height above the pan according to the size of the fowls to be fed from the device. To secure the feed pan cover in adjusted position I provide the same with spring pins 16 which may be engaged with any of the openings 13. In the center of the feed pan and below the open bottom of the hopper is a deflecting cone 17 which is also preferably made of sheet metal and is formed at its base with outstanding lugs 18 which may be soldered or otherwise secured on the bottom of the feed pan. This cone causes the feed to flow outwardly through the openings 4 at the bottom of the hopper into the pan as the feed is consumed by the fowls so that it is automatically fed thereto and the feed is also prevented from accumulating and lodging in the bottom at the center of the feed pan. To prevent the fowls from throwing the feed sidewise with their bills and wasting it I provide a series of radially arranged partitions 18 which are suitably spaced apart, have their outer ends secured to the wall of the feed pan and their inner ends secured to the wall of the hopper.

While I have herein shown and described a preferred form of my invention I would have it understood that changes may be made in the form, proportion and construction of the several parts without departing from the spirit of the invention and within the scope of the appended claim.

Having thus described my invention, I claim:—

A poultry feeder of the class described comprising a feed pan, a bottomless hopper arranged on the center of the feed pan and having openings at its lower side, a spreading cone in the center of the pan and at the bottom of the hopper and a cover for the pan carried by and vertically adjustable on the hopper, the said hopper being provided with supporting bars on its sides and having adjusting openings, and the said cover being provided with spring pins to engage the openings of said supporting bars.

In testimony whereof I affix my signature in presence of two witnesses.

ANDREW JOHNSON.

Witnesses:
   John Johnson, Jr.,
   Edwin Johnson.